United States Patent
Rickard

[15] 3,696,584
[45] Oct. 10, 1972

[54] APPARATUS FOR FILLING A CONTAINER WITH A WEIGHED LOAD OF FRAGILE ARTICLES

[72] Inventor: Donn J. Rickard, Glendora, Calif.
[73] Assignee: Brown International Corporation, Covina, Calif.
[22] Filed: Oct. 23, 1970
[21] Appl. No.: 83,390

[52] U.S. Cl. .................... 53/239, 53/59 W, 177/120, 198/39
[51] Int. Cl. ............................................... B65b 5/10
[58] Field of Search ............. 53/36, 59 R, 59 W, 239; 141/83; 198/39, 220 A; 177/50, 119, 120, 121

[56] References Cited

UNITED STATES PATENTS

| | | | |
|---|---|---|---|
| 2,151,107 | 3/1939 | Howard | 177/120 X |
| 2,675,120 | 4/1954 | Autenrieth | 177/119 X |
| 3,172,491 | 3/1965 | Mainey | 177/120 |

*Primary Examiner*—Robert L. Spruill
*Attorney*—Lyon & Lyon

[57] ABSTRACT

Apparatus for delivering a weighed load of fragile articles, such as grapefruit sections, to a container includes a series of vibratory chutes or pans. The first chute receives articles in response to demand from the second chute or pan into which it discharges, so that articles in said pan remain at a one-layer depth. This promotes maximum control of feeding of articles from the pan into a clamshell-type hopper pendantly supported on a weighing scale. When the required weight of fragile articles is accumulated within the hopper, the clamshell sections open automatically to discharge the weighed load into a filling chute leading to an open top container. Syrup is introduced into the filling chute when the hopper opens in order to lubricate the filling chute and to facilitate entry of the fragile articles one by one into the container along with the syrup.

5 Claims, 9 Drawing Figures

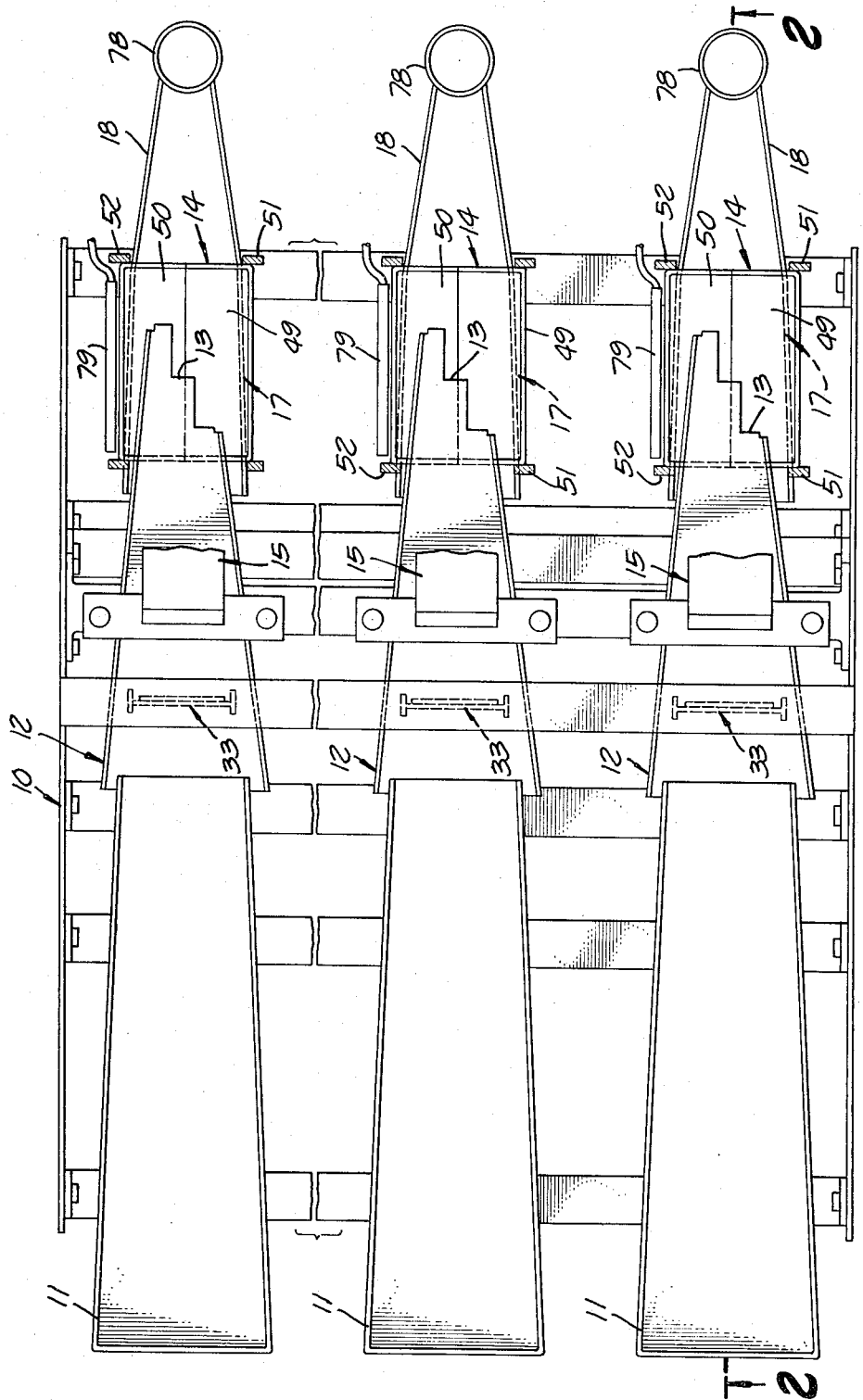

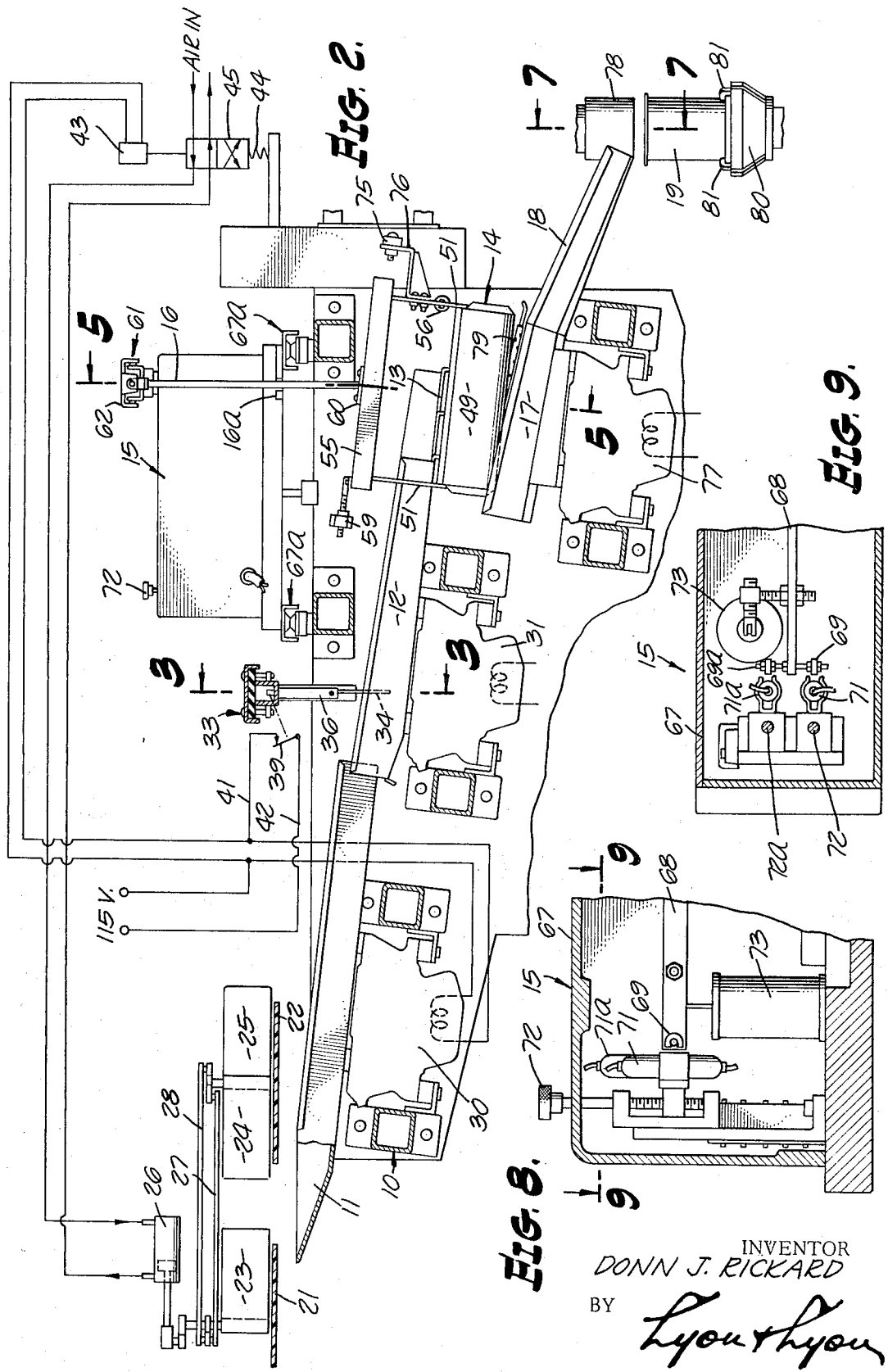

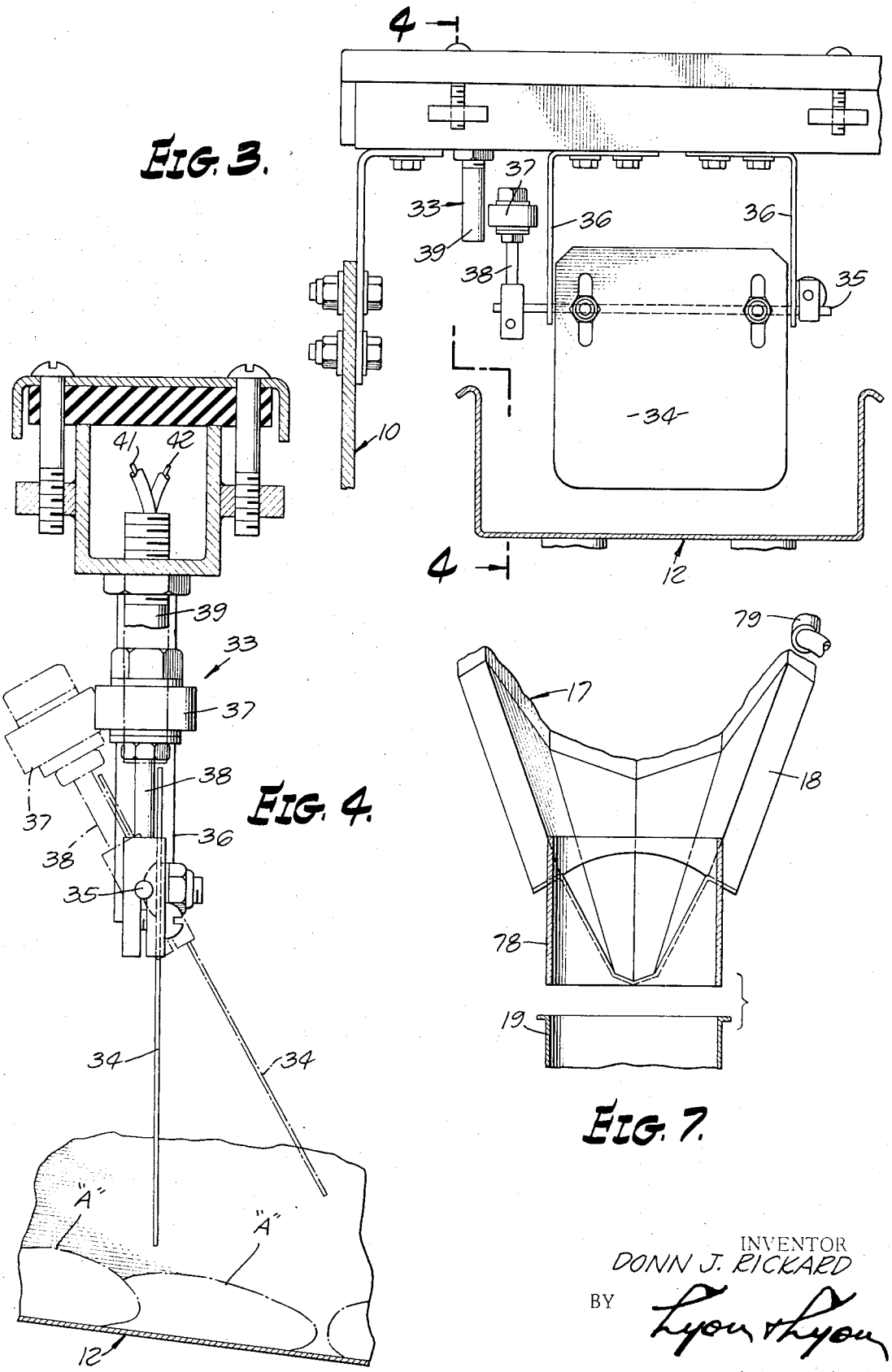

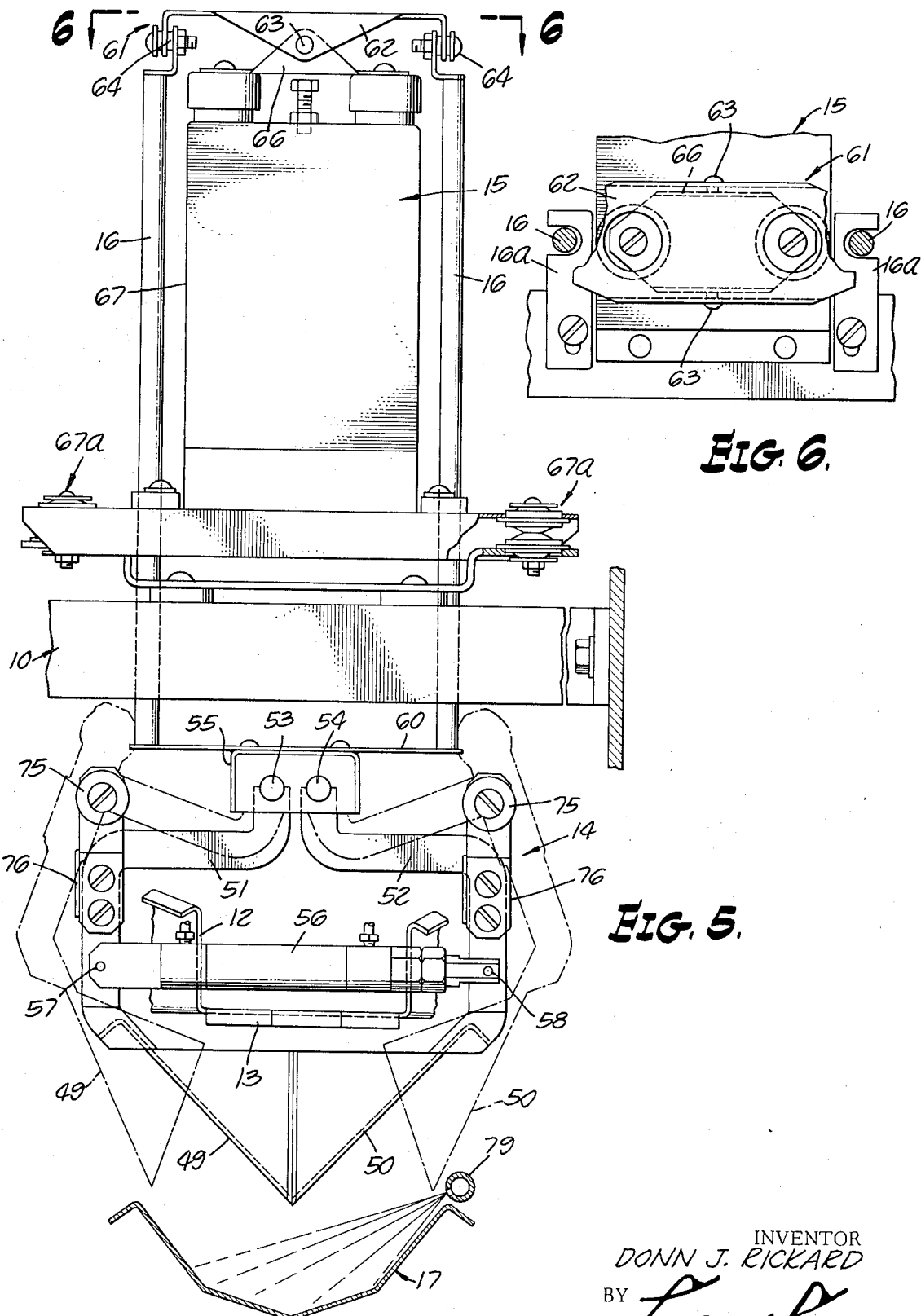

APPARATUS FOR FILLING A CONTAINER WITH A WEIGHED LOAD OF FRAGILE ARTICLES

This invention relates to apparatus for delivering a weighed quantity of fragile articles such as, for example, grapefruit sections to a container. It is important that the "drained weight" of the articles in any one container be no lower than a predetermined limit, and it is also important for economic reasons that this limit not be exceeded by more than the weight of one grapefruit section. It is also important that the apparatus for handling, weighing and filling the containers produce minimum damage to the fragile grapefruit sections.

In accordance with this invention, a separate supply system is provided for each of the filling stations, which operates "on demand." Each of these supply systems includes a vibratory supply chute discharging into a vibratory feed pan. Means are provided for controlling the rate of supply of articles to the feed pan, so that the articles never reach more than one layer in depth. The articles pass from the discharge end of the pan into a hopper which is supported on a weighing scale. When the weight of articles in the hopper reaches a predetermined amount, the hopper discharges the weighed load all at one time into a filling chute leading to an open top container. Liquid syrup is introduced into this filling chute to lubricate the movement of the articles making up the weighed load as they move into the open top container, along with the syrup.

In the drawings:

FIG. 1 is a plan view partly broken away, showing a preferred embodiment of this invention.

FIG. 2 is a sectional elevation partly broken away, taken substantially on the lines 2—2 as shown in FIG. 1.

FIG. 3 is a transverse sectional detail taken substantially on the lines 3—3 as shown in FIG. 2.

FIG. 4 is a sectional detail taken substantially on the lines 4—4 as shown in FIG. 3.

FIG. 5 is a transverse sectional elevation taken substantially on the lines 5—5 as shown in FIG. 2.

FIG. 6 is a top plan view partly broken away, taken substantially on the lines 6—6 as shown in FIG. 5.

FIG. 7 is a sectional detail taken substantially on the lines 7—7 as shown in FIG. 2.

FIG. 8 is an enlarged sectional view of a portion of FIG. 2.

FIG. 9 is a sectional detail taken substantially on the lines 9—9 as shown in FIG. 8.

Referring to the drawings, a stationary frame generally designated 10 supports a plurality of vibratory feed chutes 11 each of which is arranged to discharge into vibratory feed pans 12. Each feed pan 12 has a discharge end 13 which discharges by gravity into a clamshell hopper assembly 14. Each hopper assembly 14 is individually suspended on parallel vertical rods 16 on a weighing scale device generally designated 15. The hopper assembly 14 may be opened as described below to discharge into a vibratory filling chute 17 having a nozzle portion 18 for discharging into an open top container 19. The supply chutes 11 are each positioned under a pair of horizontal conveyor belts 21 and 22 (FIG. 2) traveling in the same direction and carrying fragile articles such as grapefruit sections each having the shape of a spherical wedge. Diverter blades 23, 24 and 25 are mounted in close proximity to the upper surface of the traveling belts 21 and 22 and serve to divert grapefruit sections laterally off side edges of the belts whenever the diverter blades are moved to a slant position above the belts. A power cylinder assembly 26 is selectively operable to swing the diverter blades from an inoperative position to the slant operative position as shown in FIG. 2. The diverter blade 23 is actuated directly from the power cylinder assembly 26, and the diverter blades 24 and 25 are actuated through links 27 and 28. This diverter blade apparatus is described in detail in the copending application of Holbrook et al. Ser. No. 83,366 entitled "Side Discharge Belt Conveyor Assembly" filed of even date herewith.

Each of the container filling systems operates independently of the others. Since they are duplicates, a description of one will suffice. The fragile articles swept off the side edges of the horizontal traveling belts 21 and 22 are received in the supply chute 11 and are caused to travel downward along the chute by a vibrator 30 secured to the underside of the supply chute 11. The feed pan 12 has a flat bottom wall terminating in a zig-zag discharge end 13. The feed pan 12 also has a vibrator 31 secured to its underside for advancing the fragile articles received from the supply chute 11. Both the supply chute 11 and feed pan 12 are open at the top. Means are provided in connection with feed pan 12 for delivering fragile articles from the traveling belts 21 and 22 into supply chute 11 and for delivering such articles into the feed pan 12 only when the desired quantity of articles in the feed pan 12 falls below a predetermined level. It is desired to maintain the fragile articles only one layer deep in the feed pan 12 in order to maintain precise control over the rate of feed from the discharge end 13 into the hopper 14. While the various vibrators are shown as electrically operated, it is to be understood that pneumatically operated vibrators may be used to obtain more power, if desired.

As shown in FIGS. 2, 3 and 4 of the drawings, the flow control switch generally designated 33 includes a swinging plate 34 extending into the feed pan 12 and having sufficient clearance with the bottom of the pan to permit only one layer of grapefruit sections to pass with clearance under the plate 34. This plate is mounted on a horizontal pivot shaft 35 carried on stationary bracket 36. A counterweight 37 formed of magnetic material is mounted on an arm 38 clamped to the shaft 35. An electric switch assembly 39 of conventional design closes an electrical circuit through electrical wires 41 and 42 whenever the magnetic part 37 closely approaches the switch 39. This occurs when the plate 34 is in vertical position. When grapefruit sections "A" accumulate in the feed pan 12 to a depth of more than one layer, the grapefruit sections contact the plate 34 to swing it towards the phantom line position shown in FIG. 4. This in turn causes the magnetic part 37 to move away from the switch 39, with the result that the electrical circuit through wires 41 and 42 is opened. This shuts off the supply of electrical power to the vibrator 30, thereby interrupting delivery of grapefruit sections from the supply chute 11 to the feed pan 12.

Also, opening of the electrical switch 39 interrupts the supply of power to the solenoid 43 so that the spring 44 shifts the air valve 45 to reverse air pressure applied to the power cylinder assembly 26, thereby swinging the diverter blades 23, 24 and 25 to an inoperative position in which they extend parallel to the direction of travel of the belts 21 and 22, and therefore interrupt delivery of grapefruit sections to the feed chute 11. When the level of grapefruit sections "A" in the feed pan 12 returns to a single-layer depth, the plate 34 swings back to a vertical position, closing the switch 39 and thereby re-energizing the vibrator 30 and swinging the diverter blades 23, 24 and 25 to operative slanted position.

The hopper 14 comprises a pair of clamshell sections 49 and 50 each fixed to a pair of longitudinally spaced offset arms 51 and 52. The arms are pivoted at 53 and 54 at opposite ends of a longitudinal support 55. A double ended power cylinder assembly 56 extends between the clamshell sections 49 and 50 and is pivotally connected to them at 57 and 58. The power cylinder assembly 56 swings the clamshell sections 49 and 50 between the closed position shown in full lines in FIG. 5 to the open position shown in phantom lines. The notched discharge end 13 of the feed pan 12 insures that fragile articles are delivered into the hopper 14 at locations spaced along the length of the hopper, instead of piling up in the center of the hopper. In closed position, the hopper 14 receives fragile articles one by one from the discharge end 13 of the feed pan 12, and in open position the fragile articles are discharged into the filling chute 17.

The tension rods 16 support the hopper assembly 14 by means of the cross plate 60 and the longitudinal support 55. These tension rods are supported at their upper ends by means of a gimbal assembly generally designated 61 and which includes a rocking plate 62 supported for pivotal movement about longitudinal pins 63 and connected by transverse pins 64 to brackets attached to the upper ends of the tension rods 16. The tension rods 16 straddle a portion of the weighing scale assembly 15, and the gimbal connection 61 assures that the entire weight of the hopper assembly and contents rests on the beam actuator 66 of the scale mechanism.

The weighing scale mechanism 15 is conventional and includes a housing 67 forming an enclosure for a pivoted beam 68 having laterally spaced magnetic elements 69 mounted near its swinging end. Conventional magnetic switch devices 71 and 71a are mounted on individual adjusting screws 72 and 72a. This allows individual vertical adjustment of the switches relative to the magnetic devices on the scale beam 68. A dash pot assembly 73 is provided to prevent "hunting" of the scale beam 68. As the entire weight of the hopper assembly 14 and contents approaches a predetermined value, the beam 68 lifts the magnetic element 69 into close proximity with the central portion of the electric switch 71. An electric circuit, not shown, triggered by closure of switch 71 reduces the vibration intensity of chute 12 to cause slower feeding of material into the hopper. Beam 68 continues to rise but at a slower rate. When the magnetic device 69a closes switch 71a, the vibrator 31 on chute 12 ceases operation, which stops the flow of material into the hopper. Simultaneously, an electro-pneumatic circuit, now shown, then actuates the power cylinder assembly 56 to separate the clamshell sections 49 and 50, thereby causing the hopper to discharge its contents into the filling chute 17. Suitable control mechanism causes closing of the hopper, and a time delay circuit energized by switch 71a initiates flow of syrup into the chute 17. Upon expiration of the time, the flow of syrup is cut off. The change in weight of the hopper assembly, following discharge of the weighed load, causes the swinging end of the beam 68 to move the magnetic elements 69 and 69a downward away from the central portion of the switches 71 and 71a.

The weighing scale assembly 15 is supported on the frame 10 by means of a plurality of cushion mounts 67a. The adjustable weight 59 at the end of the support 55 permits balancing of the suspended empty hopper 14 to avoid rubbing friction contact between the suspension rods 16 and their sway-prevention elements 16a.

The weighed load of articles deposited in the filling chute 17 by the open hopper moves downward under influence of the vibrator 77 attached to the lower portion of the filling chute 17. The weighed load then travels through the nozzle 18 and into the circular guide 78 formed at the extreme ends thereof. This guide is positioned directly over the open top container 19. The lower end of the guide 78 is spaced only a minimum distance above the upper end of the container 19 in order to minimize the extent of the gravity drop of the articles into the container. The container 19 is illustrated in FIG. 2 as being mounted on a rotary assembly 80 having a retractable fingers 81 which grip the lower end of the container. This rotary apparatus together with the apparatus for conveying the containers to and from filling position is shown in the copending application of Rickard et al. entitled "Container Filling Apparatus," Ser. No. 83,389 filed of even date herewith.

Liquid syrup is delivered into the filling chute 17 from the distributor nozzle 79 upon closure of switch 71a as described above. The syrup lubricates the filling chute 17 and its nozzle 18 to facilitate movement of the weighed load into the open top container 19. The syrup and the weighed load enter the container simultaneously in an intimate mixture. It will be observed that the syrup is not a part of the load which is weighed, and hence the "drained weight" of the grapefruit sections is closely controlled independently of the amount of syrup which enters the container along with the grapefruit sections.

It will be noted that the cross section shape of the filling chute 17 and nozzle 18 becomes deeper and more and more angular toward the discharge end of the nozzle 18. This results in moving of the grapefruit sections of the weighed load one by one into the open top container 19.

Having fully described my invention, it is to be understood that I am not to be limited to the details herein set forth but that my invention is of the full scope of the appended claims.

I claim:

1. Apparatus for delivering to a container a weighed quantity of fragile articles such as grapefruit sections, comprising in combination: a vibratory feed pan for transporting fragile articles, means for delivering the articles to the feed pan, means for limiting the rate of delivery of articles to the feed pan to maintain the articles in the feed pan substantially only one layer deep, said feed pan having a discharge end, a hopper positioned below the discharge end of the feed pan to receive said articles by gravity fall, means including a weighing scale for pendantly supporting said hopper, means whereby said hopper may be emptied, a filling chute adapted to receive a weighed quantity of articles from said hopper, said filling chute having a nozzle to convey said articles to an open top container, and means for introducing a liquid into the filling chute to lubricate the movement of said articles through the nozzle and to enter the container with said articles.

2. The combination set forth in claim 1 in which the feed pan has a flat bottom wall terminating in a zig-zag discharge end.

3. Apparatus for delivering to a container a weighed quantity of fragile articles such as grapefruit sections, comprising in combination: a vibratory feed pan for transporting fragile articles, said feed pan having a discharge end, a hopper positioned below the discharge end of the feed pan to receive said articles by gravity fall, means including a weighing scale for pendantly supporting said hopper, means whereby said hopper may be emptied, a vibratory filling chute adapted to receive a weighed quantity of articles from said hopper, said filling chute having a nozzle to convey said articles to an open top container, and means for introducing a liquid into the filling chute to lubricate the movement of said articles through the nozzle and to enter the container with said articles.

4. Apparatus for delivering to a container a weighed quantity of fragile articles such a grapefruit sections, comprising in combination: a vibratory feed pan for transporting fragile articles, means for delivering the articles to the feed pan, means for limiting the rate of delivery of articles to the feed pan to maintain the articles in the feed pan substantially only one layer deep, said feed pan having a zig-zag discharge end, a clamshell hopper positioned below the discharge end of the feed pan to receive said articles at longitudinally spaced locations by gravity fall, said hopper having two pivoted elements laterally movable between a closed position and an open position, means including a weighing scale for pendantly supporting said hopper, and a vibratory filling chute adapted to receive a weighed quantity of articles from said hopper when said elements are moved to open position, said filling chute having a nozzle to convey said articles to an open top container.

5. Apparatus for delivering to a container a weighed quantity of fragile articles such as grapefruit sections, comprising in combination: a supply chute, a vibratory feed pan for transporting fragile articles received from the supply chute, means for limiting the rate of delivery of articles to the feed pan to maintain the articles in the feed pan substantially only one layer deep, said feed pan having a discharge end, a clamshell hopper positioned below the discharge end of the feed pan to receive said articles by gravity fall, said hopper having two pivoted elements laterally movable between a closed position and an open position, means including a weighing scale for pendantly supporting said hopper, a vibratory filling chute adapted to receive a weighed quantity of articles from said hopper when said elements are moved to open position, said filling chute having a nozzle to convey said articles to an open top container, and means for introducing a liquid into the filling chute to lubricate the movement of said articles through the nozzle and to enter the container with said articles.

* * * * *